(No Model.)

E. F. SMITH.
HORSESHOE.

No. 604,091. Patented May 17, 1898.

WITNESSES.
A. D. DuBois.
Chas. C. Bowes M. D.

INVENTOR.
Edwin F. Smith.
by Atty N. DuBois.

THE NORRIS PETERS CO., PHOTO-LITHO., WASHINGTON, D. C.

UNITED STATES PATENT OFFICE.

EDWIN F. SMITH, OF SPRINGFIELD, ILLINOIS.

HORSESHOE.

SPECIFICATION forming part of Letters Patent No. 604,091, dated May 17, 1898.

Application filed July 28, 1897. Serial No. 646,250. (No model.)

*To all whom it may concern:*

Be it known that I, EDWIN F. SMITH, a citizen of the United States, residing at Springfield, in the county of Sangamon and State of Illinois, have invented certain new and useful Improvements in Horseshoes, of which the following is such a full, clear, and exact description as will enable others skilled in the art to which it appertains to make and use my said invention.

My invention relates to horseshoes of that class in which cushions of yielding material are employed to prevent the slipping of the horse's feet and to relieve the shock due to the concussions of the horse's feet on the hard surface of paved streets or hard roads.

The purposes of my invention are to provide a horseshoe consisting of two members—viz., an upper or affixable member, which may be secured to the horse's feet by nails in the usual well-known manner, and a lower member, detachably connected with the said upper member in such a manner that said lower member may be readily detached for replacement or repair without necessitating the removal of the upper member from the horse's foot—to provide toe and heel calks of novel and improved form adapted to be detachably connected with a horseshoe, to provide in a horseshoe consisting of two members detachably connected with each other, as described, means for housing removable toe and heel calks in one of said members, and to provide simple and effective means for connecting together said upper and lower members and said toe and heel calks in such manner as to form a cushion between said members.

With these ends in view my invention consists in the novel features of construction and combinations of parts shown in the annexed drawings, to which reference is hereby made, and hereinafter particularly described, and pointed out in the claims.

Figure 1:
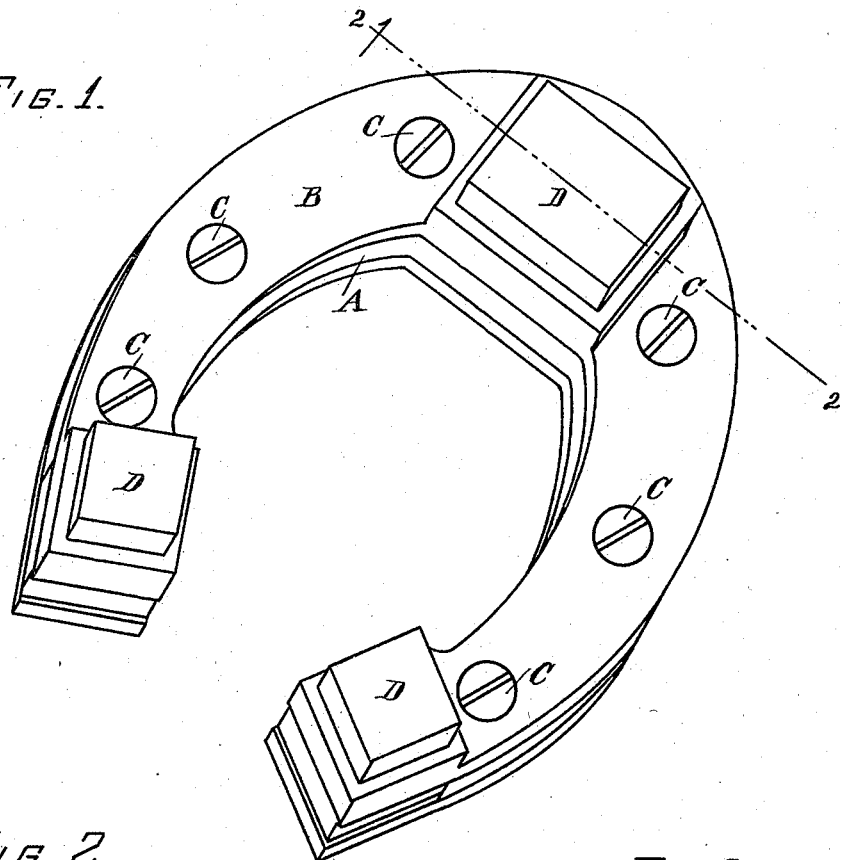
Figure 2:
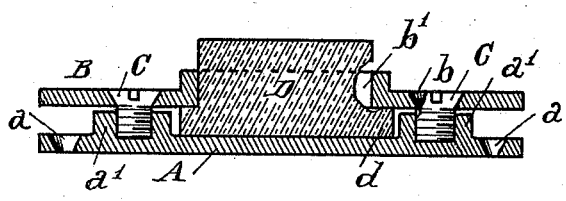
Figure 3:
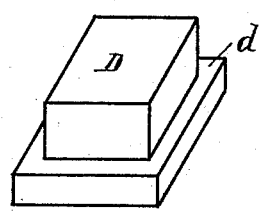

Referring to the drawings, Figure 1 is a perspective view of the complete horseshoe as seen from the under side. Fig. 2 is a vertical transverse section on the line 2 2 of Fig. 1, and Fig. 3 is a detached perspective view of one of the heel-calks.

Similar letters of reference designate like parts in all of the views.

The main structure of the horseshoe consists of two members—viz., a fixed member A and a detachable member B.

In the member A are a number of suitably-placed nail-holes $a$, adapted to receive nails which serve to secure the member to the horse's foot in the same manner that horseshoes of the common well-known form are ordinarily secured. On the under side of the member A are a suitable number of internally-screw-threaded lugs $a'$, which receive screws C, which pass through holes $b$ in the member B and serve to connect the member B with the member A.

The member B is pierced at the heel and at the toe by openings $b'$, adapted to receive the toe-calk and the heel-calks, substantially as shown. I prefer to use rectangular calks housed in rectangular or box-shaped openings in the member B; but calks of other forms may be used, and in that case the openings in the member B may be varied to suit the form of the calks without departing from the spirit of my invention.

The calks D are preferably of the form clearly shown in Fig. 3 and are preferably made of vulcanized rubber, indurated fiber, or other tough and slightly-yielding material; but calks of metal or other unyielding material may be used without departing from my invention.

The calk D in its preferable form has an integral ledge $d$ extending all around the calk. This ledge serves a double purpose—viz., it serves to prevent the calk from falling through its housing in the member B, and when the calk is made of yielding material and the parts are assembled, as shown in Figs. 1 and 2, it serves to form a cushion between the members A and B.

When the calks D become worn by use and it is desired to replace them by new ones, it is only necessary to remove the screws C, when the member B may be detached, the worn calks removed from their housings, and new calks substituted. The member B may then be again placed on the member A and secured in place by the screws C. The member A being securely fixed to the horse's foot may on occasion serve as a shoe when for any reason it may be desirable to dispense with the member B and the removable calks D, and in that case the lugs $a'$ on the member A will serve as calks for such temporary use.

Having fully described my invention, what I claim as new, and desire to secure by Letters Patent, is—

1. In a horseshoe, a calk having a ledge, in combination with an affixable member, a detachable member, and means for connecting said members, the ledge on said calk serving as a cushion between said members, as set forth.

2. In a horseshoe, the combination of an affixable member having lugs, a detachable member fitting on said affixable member and having openings adapted to receive calks, removable flanged calks fitting in the openings in said detachable member, and screws connecting said members, as set forth.

In witness whereof I have hereunto subscribed my name, at Springfield, Illinois, this 24th day of July, A. D. 1897.

EDWIN F. SMITH.

Witnesses:
 JOHN O. RAMES, Jr.,
 W. S. JAYNE.